United States Patent [19]

Liu

[11] Patent Number: 4,601,006

[45] Date of Patent: Jul. 15, 1986

[54] ARCHITECTURE FOR TWO DIMENSIONAL FAST FOURIER TRANSFORM

[75] Inventor: Wentai Liu, Raleigh, N.C.

[73] Assignee: Research Corporation, New York, N.Y.

[21] Appl. No.: 539,540

[22] Filed: Oct. 6, 1983

[51] Int. Cl.[4] .......................................... G06F 15/332
[52] U.S. Cl. .................................................. 364/726
[58] Field of Search ...................................... 364/726

[56] References Cited

U.S. PATENT DOCUMENTS

| | | | |
|---|---|---|---|
| 3,777,131 | 12/1973 | Llewellyn | 364/726 |
| 3,952,186 | 4/1976 | Speiser et al. | 364/726 |
| 4,092,723 | 5/1978 | Picquendar et al. | 364/726 |
| 4,159,528 | 6/1979 | Perry | 364/726 |
| 4,328,555 | 5/1982 | Nussbaumer | 364/726 |

OTHER PUBLICATIONS

Stone, "Parallel Processing with the Perfect Shuffle", *IEEE Trans. on Computers*, vol. C-20, No. 2, Feb. 1971, pp. 153-161.

Joshi et al., "A Video Rate Two Dimensional FFT Processor", *ICASSP 80 Proceedings IEEE International Conference on Acoustics, Speech & Signal Processing*, Denver, Co., Apr. 9-11, 1980, pp. 774-777.

*Primary Examiner*—David H. Malzahn
*Attorney, Agent, or Firm*—Scully, Scott, Murphy & Presser

[57] ABSTRACT

A novel architecture and circuitry for implementing a new fast fourier transform algorithm which does not require a very large core memory and also does not require a transpose of a matrix. A pipelined and parallel architecture implements the two dimensional fast fourier transform on an array of input data values, with the transformation being performed by a plurality of serially arranged pass stages. Each pass stage includes an input shuffle arrangement for receiving an ordered set of input data from a row or column of a two dimensional matrix of such input data values, and for performing a shuffle operation thereon to produce a shuffled order of the input data. Each pass stage further includes a plurality of identical switching circuits coupled in parallel to receive the shuffled order of input data. Each switching circuit includes an arithmetic logic unit which receives four input data values and performs four data transformations thereon to produce four output data values, with each of the four data transformations including a first operation of selective addition or subtraction of the four input data values, followed by a second operation of selective multiplication by an exponential multiplier.

14 Claims, 6 Drawing Figures

FIG. 1 (ARITHMETIC LOGIC CIRCUIT)

FIG. 6 THE PERFECT SHUFFLE FOR N=8

FIG.2 DATA FLOW DIAGRAM FOR 4X4 FFT

FIG. 3

FIG. 4 THE ith PASS CONTROL SWITCH.
(FIRST POSITION)

FIG. 5 THE ith PASS CONTROL SWITCH.
(SECOND POSITION)

ARCHITECTURE FOR TWO DIMENSIONAL FAST FOURIER TRANSFORM

BACKGROUND OF THE INVENTION

1. Field of the Invention

The present invention relates generally to novel architecture and circuitry for implementing a new two dimensional fast fourier transform algorithm, and more particularly pertains to a novel pipelined and parallel architecture for implementing a new two dimensional fast fourier transform algorithm which is developed herein.

2. Discussion of the Prior Art

Two dimensional Fast Fourier Transform (FFT) has been widely applied in the areas of image enhancement, image coding, image compression and restoration, radar, and tomography. Two major problems have existed in the implementation of a two dimensional FFT either in software or hardware. One is the problem of data storage, since a practically useful two dimensional FFT normally requires a very large core memory in the execution of the algorithm. For example, a 512×512 FFT for radar applications would normally require 512K bytes core memory which is beyond the capacity of most systems. In many applications the matrix is stored on a mass storage device, e.g. a disk or a tape, where the smallest record that can be easily accessed is an entire row or column.

Avoidance of heavy traffic between the main memory and a second memory is a first crucial problem to the implementation of an efficient two dimensional FFT. Another problem is in the matrix transpose. In the literature, most algorithms and/or their implementations require the transpose of a matrix either by Single Instruction Multiple Data (SIMD) or by conventional machine. The efficient storage of data in the secondary storage device such that it can avoid the matrix transpose or minimize the traffic between the main memory and the secondary memory is also a crucial problem.

Two kinds of two dimensional FFT algorithms have been proposed in the prior art literature. In one, a two dimensional transform is accomplished by executing one dimensional FFT row-column wisely (column-row wisely). The other is a vector algorithm. Implementing a two dimensional FFT in a Von Neumann machine using either a row-column-wise algorithm or a vector algorithm normally causes a serious traffic problem between the main and secondary memories and therefore produces extremely poor performance. On the other hand, implementing a two dimensional FFT in a SIMD or Multiple Instruction, Multiple Data (MIMD) environment using row-column-wise algorithm still faces the serious problem of the matrix transpose and does not have high processor utilization.

SUMMARY OF THE INVENTION

Accordingly, it is a primary object of the present invention to provide a novel architecture and circuitry for implementing a new fast fourier transform algorithm which does not require a very large core memory for implementation of the algorithm.

A further object of the subject invention is the provision of a novel architecture and circuitry of the aforementioned type which does not require the transpose of a matrix.

In accordance with the teachings herein, the present invention provides a pipelined and parallel architecture for implementing a two dimensional fast fourier transform on an array of input data values, with the transformation being performed by a plurality of serially arranged pass stages. Each pass stage includes an input shuffle arrangement for receiving an ordered set of input data from a row or column of a two dimensional matrix of such input data values, and for performing a shuffle operation thereon to produce a shuffled order of the input data. Each pass stage further includes a plurality of identical switching circuits coupled in parallel to receive the shuffled order of input data. Each switching circuit includes an arithmetic logic unit which receives four input data values and performs four data transformations thereon to produce four output data values, with each of the four data transformations including a first operation of selective addition or subtraction of the four input data values, followed by a second operation of selective multiplication by an exponential multiplier.

In greater detail, each arithmetic logic unit receives four input data values a, b, c and d, and then combines the input data values by executing the following four data operations thereon to produce four output data values, A, B, C and D.

$$A = [a+b+c+d]\omega_N^0,$$

$$B = [a-b+c-d]\omega_N^\nu,$$

$$C = [a+b-c-d]\omega_N^\mu,$$

and $$D = [a-b-c+d]\omega_N^{\mu+\nu},$$

wherein $\omega_N^0$, $\omega_N^\nu$, $\omega_N^\mu$ and $\omega_N^{\mu+\nu}$ are the exponential multipliers.

Pursuant to the teachings of the present invention, for a two dimensional array of N by N data values, the first pass stage performs data transformations on sets of data values arranged in the four corners of windows in window sizes N/2 by N/2, and in the second pass stage performs data transformations on sets of data values arranged in window sizes $N/2^2$ by $N/2^2$, and in the $i^{th}$ pass stage performs data transformations on sets of data values arranged in window sizes $N/2^i$ by $N/2^i$, and in the last pass stage performs data transformations on sets of data values arranged in a 1 by 1 data window size.

In one particularly advantageous embodiment, each switching circuit referred to above includes a set of two input synchronous switches for switching input data on two input data lines into either the arithmetic logic unit therein or into a set of two synchronous delay lines. Moreover, a set of two output synchronous switches is coupled to the arithmetic logic unit and also to the set of two synchronous delay lines for switching input data therefrom to either two data output lines or as data inputs to the arithmetic logic unit. Moreover, for each switching circuit in each $i^{th}$ pass, the two synchronous delay lines have delays of $N/2^i$, and in the two input and two output synchronous switches are simultaneously and synchronously switched after each delay of $N/2^i$.

BRIEF DESCRIPTION OF THE DRAWINGS

The foregoing objects and advantages of the present invention for a novel architecture for implementing a new algorithm for a fast fourier transform may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

The two dimensional Fast Fourier Transform is defined as follows:

$$X(k_1, k_2) = \sum_{n_1=0}^{N-1} \sum_{n_2=0}^{N-1} x(n_1, n_2) W_N^{n_1 k_1} W_N^{n_2 k_2}$$

The following limited derivation or development is offered of the algorithm disclosed herein which is implemented by the architecture and circuits of the present invention.

Initially, the matrix $[x(n_1, n_2)]$ can be decomposed into four submatrices $[a(n_1, n_2)]$, $[b(n_1, n_2)]$, $[c(n_1, n_2)]$, and $[d(n_1, n_2)]$. i.e.

$$[x(n_1, n_2)] = \begin{matrix} a(n_1,n_2) & b(n_1,n_2) \\ c(n_1,n_2) & d(n_1,n_2) \end{matrix}$$

$$X(k_1, k_2) = \sum_{n_1=0}^{\frac{N}{2}-1} \sum_{n_2=0}^{\frac{N}{2}-1} x(n_1, n_2) W_N^{n_1 k_1} W_N^{n_2 k_2} +$$

$$\sum_{n_1=0}^{\frac{N}{2}-1} \sum_{n_2=\frac{N}{2}}^{N-1} x(n_1, n_2) W_N^{n_1 k_1} W_N^{n_2 k_2} +$$

$$\sum_{n_1=\frac{N}{2}}^{N-1} \sum_{n_2=0}^{\frac{N}{2}-1} x(n_1, n_2) W_N^{n_1 k_1} W_N^{n_2 k_2} +$$

$$\sum_{n_1=\frac{N}{2}}^{N-1} \sum_{n_2=\frac{N}{2}}^{N-1} x(n_1, n_2) W_N^{n_1 k_1} W_N^{n_2 k_2}$$

The upper summation limits can be changed such that the matrix [X] can be substituted by four submatrices [a], [b], [c], and [d].

$$X(k_1, k_2) = \sum_{n_1=0}^{\frac{N}{2}-1} \sum_{n_2=0}^{\frac{N}{2}-1} a(n_1, n_2) W_N^{n_1 k_1} W_N^{n_2 k_2} +$$

-continued $$\sum_{n_1=0}^{\frac{N}{2}-1} \sum_{n_2=0}^{\frac{N}{2}-1} b(n_1, n_2) e^{-j\pi k_2} W_N^{n_1 k_1} W_N^{n_2 k_2} +$$

$$\sum_{n_1=0}^{\frac{N}{2}-1} \sum_{n_2=0}^{\frac{N}{2}-1} c(n_1, n_2) e^{-j\pi k_1} W_N^{n_1 k_1} W_N^{n_2 k_2} +$$

$$\sum_{n_1=0}^{\frac{N}{2}-1} \sum_{n_2=0}^{\frac{N}{2}-1} d(n_1, n_2) e^{-j\pi(k_1+k_2)} W_N^{n_1 k_1} W_N^{n_2 k_2}$$

Therefore we have $$X(k_1, k_2) = \sum_{n_1=0}^{\frac{N}{2}-1} \sum_{n_2=0}^{\frac{N}{2}-1} [a(n_1,n_2) + b(n_1,n_2)e^{-j\pi k_2} +$$

$$c(n_1,n_2)e^{-j\pi k_1} + d(n_1,n_2)e^{-j\pi(k_1+k_2)}] W_N^{n_1 k_1} W_N^{n_2 k_2}$$

Now we divide the transformed space into four submatrices, namely $X[2k_1, 2k_2]$, $X[2k_1, 2k_2+1]$, $X[2k_1+1, 2k_2]$, and $X[2k_1+1, 2k_2+1]$.

$\underline{X(2k_1, 2k_2) \text{ (even-even sequence - A)}}$ $$A = \sum_{n_1=0}^{\frac{N}{2}-1} \sum_{n_2=0}^{\frac{N}{2}-1} [a(n_1,n_2) + b(n_1,n_2)e^{-j2\pi k_2} +$$

$$c(n_1,n_2)e^{-j2\pi k_1} + d(n_1,n_2)e^{-j2\pi(k_1+k_2)}] W_{\frac{N}{2}}^{n_1 k_1} W_{\frac{N}{2}}^{n_2 k_2}$$

$$A = \sum_{n_1=0}^{\frac{N}{2}-1} \sum_{n_2=0}^{\frac{N}{2}-1}$$

$$\{a(n_1,n_2) + b(n_1,n_2) + c(n_1,n_2) + d(n_1,n_2)\} W_{\frac{N}{2}}^{n_1 k_1} W_{\frac{N}{2}}^{n_2 k_2}$$

$\underline{X(2k_1, 2k_2 + 1) \text{ (even-odd sequence - B)}}$ $$B = \sum_{n_1=0}^{\frac{N}{2}-1} \sum_{n_2=0}^{\frac{N}{2}-1} [[a(n_1,n_2) + b(n_1,n_2)e^{-j\pi}e^{-j2\pi k_2} +$$

$$c(n_1,n_2)e^{-j2\pi k_1} + d(n_1,n_2)e^{-j\pi}e^{-j2\pi(k_1+k_2)}] W_{\frac{N}{2}}^{n_2} W_{\frac{N}{2}}^{n_1 k_1} W_{\frac{N}{2}}^{n_2 k_2}$$

$$B = \sum_{n_1=0}^{\frac{N}{2}-1} \sum_{n_2=0}^{\frac{N}{2}-1}$$

$$\{\{a(n_1,n_2) - b(n_1,n_2) + c(n_1,n_2) - d(n_1,n_2)\} W_{\frac{N}{2}}^{n_2}\} W_N^{n_1 k_1 + n_2 k_2}$$

$\underline{X(2k_1 + 1, 2k_2) \text{ (odd-even sequence - C)}}$ $$C = \sum_{n_1=0}^{\frac{N}{2}-1} \sum_{n_2=0}^{\frac{N}{2}-1}$$

$$[[a(n_1,n_2) + b(n_1,n_2)e^{-j2\pi k_2} + c(n_1,n_2)e^{-j\pi}e^{-j2\pi k_1} +$$

$$d(n_1,n_2)e^{-j\pi}e^{-k2\pi(k_1+k_2)}] W_N^{n_1}] W_{\frac{N}{2}}^{n_1 k_1} W_{\frac{N}{2}}^{n_2 k_2}$$

$$C = \sum_{n_1=0}^{\frac{N}{2}-1} \sum_{n_2=0}^{\frac{N}{2}-1}$$

-continued $$\{\{a(n_1,n_2) + b(n_1,n_2) - c(n_1,n_2) - d(n_1,n_2)\} W_N^{n_2}\} W_{\frac{N}{2}}^{n_1k_1} W_{\frac{N}{2}}^{n_2k_2}$$

$X(2k_1 + 1, 2k_2 + 1)$ (odd-odd sequence - D)

$$D = \sum_{n_1=0}^{\frac{N}{2}-1} \sum_{n_2=0}^{\frac{N}{2}-1}$$

$$[[a(n_1,n_2) + b(n_1,n_2)e^{-j\pi}e^{-j2\pi k_2} + c(n_1,n_2)e^{-j\pi}e^{-j2\pi k_1} +$$

$$d(n_1,n_2)e^{-j\pi}e^{-j2\pi((k_1+k_2))}] W_N^{n_1^2+n_2}] W_{\frac{N}{2}}^{n_1k_1} W_{\frac{N}{2}}^{n_2k_2}$$

$$D = \sum_{n_1=0}^{\frac{N}{2}-1} \sum_{n_2=0}^{\frac{N}{2}-1}$$

$$\{\{a(n_1,n_2) - b(n_1,n_2) - c(n_1,n_2) + d(n_1,n_2)\} W_N^{n_1+n_2}\} W_{\frac{N}{2}}^{n_1k_1} W_{\frac{N}{2}}^{n_2k_2}$$

The above four formulas for A, B, C and D are recursively derived until we reach the transformation of a 1 by 1 (2 data points by 2 data points) submatrix at which time the transformation is complete.

In summary, in the algorithm disclosed herein:
1. The full matrix $[x(n_1,n_2)]$ in the time domain is initially divided into a number (preferably four) of submatrices.
2. Replace the matrix [x] by the submatrices [a], [b], [c] and [d] by dividing the transformed space into four submatrices by utilizing the formulas A, B, C and D to divide the transformed space into even-even (A), even-odd (B), odd-even (C) and odd-odd (D) transforms.
3. Recursively derive formulas A, B, C, D until the transformation is completed to a 1 by 1 (2 data points by 2 data points) submatrix.

Referring to the above four equations defining A, B, C and D, it can be observed that each equation can be broken down into two parts or logical operations. The first logical operation concerns addition or subtraction of values for $a(n_1,n_2)$, $b(n_1,n_2)$, $c(n_1,n_2)$ and $d(n_1,n_2)$ in each particular matrix, and these terms are in the small parentheses in all of the equations. The second logical operation concerns multiplication of the result of the first logical operation by an exponential multiplier.

The four equations as expressed above can be explained in simpler terms in each particular matrix for matrix points a, b, c and d as follows:

$$A = [a+b+c+d]\omega_N^0$$

$$B = [a-b+c-d]\omega_N^\nu$$

$$C = [a+b-c-d]\omega_N^\mu$$

$$D = [a-b-c+d]\omega_N^{\mu+\nu}$$

where the exponential multipliers for A, B, C and D are now simplified for purposes of expression as $\omega_N^0$, $\omega_N^\nu$, $\omega_N^\mu$ and $\omega_N^{\mu+\nu}$.

Figure 1:
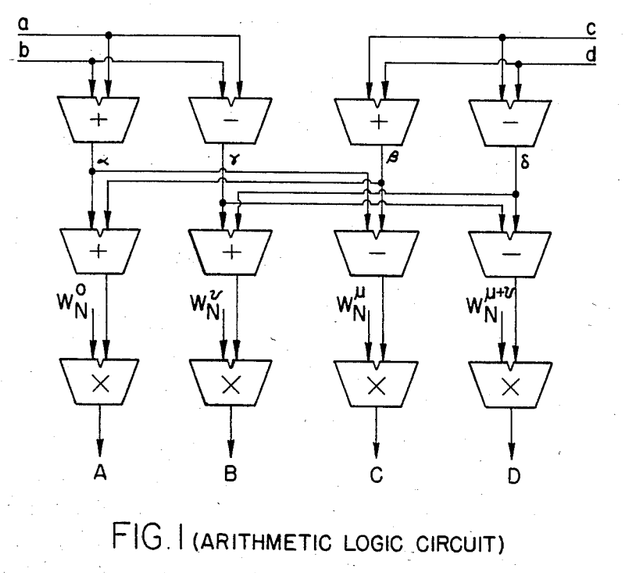
FIG. 1 is an exemplary embodiment of an Arithmetic Logic (AL) unit or circuit for performing a data transformation pursuant to the teachings of the present invention.

To simplify the calculations further for implementation by the Arithmetic Logic (AL) or Arithmetic Unit (AV) circuit of FIG. 1,
let $$\alpha = a+b$$

$$\beta = c+d$$

$$\gamma = a-b$$

$$\delta = c-d$$

then:

$$A = [\alpha+\beta]\omega_N^0$$

$$B = [\gamma+\delta]\omega_N^\nu$$

$$C = [\alpha-\beta]\omega_N^\mu$$

$$D = [\gamma-\delta]\omega_N^{\mu+\nu}$$

The above four equations for A, B, C and D can be implemented conveniently by the circuit of FIG. 1 for any four points a, b, c and d in any particular matrix. In this circuit, the data points a and b are initially summed to obtain $\alpha$, and b is subtracted from a to obtain $\gamma$. The data points c and d are summed to obtain $\beta$, and d is subtracted from c to obtain $\delta$. The values for $\alpha$ and $\beta$ are then summed to complete the first logical operation for A, and the values for $\gamma$ and $\delta$ are summed to complete the first logical operation for B. The value $\beta$ is subtracted from the value for $\alpha$ to complete the first logical operation for C, and the value for $\delta$ is subtracted from the value for $\gamma$ to complete the first logical operation for D. The product of $[\alpha+\beta]$ is then multiplied by $\omega_N^0$ to obtain A, the product of $[\gamma+\delta]$ is multiplied by $\omega_N^\nu$ to obtain B, the result of $[\alpha-\beta]$ is multiplied by $\omega_N^\mu$ to obtain C, and the result of $[\gamma-\delta]$ is multiplied by $\omega_N^{\mu+\nu}$ to obtain D.

For further illustration of the recursive division implemented by the algorithm disclosed herein, and particularly step 2 wherein the matrix [X] is replaced by the four submatrices [a], [b], [c,] and [d], the following exemplary matrix replacement is shown along with the resultant four submatrices.

| X(0,0) | X(0,1) | X(0,2) | X(0,3) |
| X(1,0) | X(1,1) | X(1,2) | X(1,3) |
| X(2,0) | X(2,1) | X(2,2) | X(2,3) |
| X(3,0) | X(3,1) | X(3,2) | X(3,3) |

Replace [X] by [a], [b], [c], and [d] as follows:

| a(0,0) | a(0,1) | b(0,0) | b(0,1) |
| a(1,0) | a(1,1) | b(1,0) | b(1,1) |
| c(0,0) | c(0,1) | d(0,0) | d(0,1) |
| c(1,0) | c(1,1) | d(1,0) | d(1,1) |

Now apply:
1. equation A for common points (0,0).
2. equation B for common points (0,1).
3. equation C for common points (1,0).
4. equation D for common points (1,1).

Figure 2:
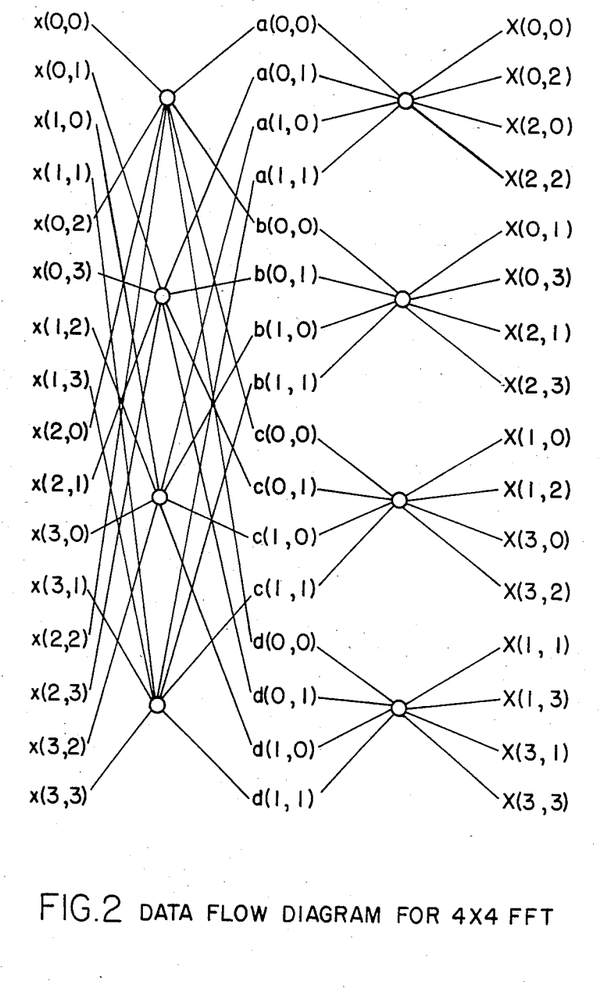
FIG. 2 illustrates the butterfly operations involved in the data flow transformation of an exemplary four by four matrix.

The butterfly operations of FIG. 2 are useful in understanding the data flow transformation of the present invention for a 4×4 [X] matrix, with the input values or data for the matrix being on the left. This data is initially combined in the four butterfly matrix operations, shown between the left and middle columns, with each butterfly operation combining the four input data values in equations A, B, C and D.

The results of the butterfly transformations in the middle column are then subjected to four further butterfly operations, shown between the middle and right columns of FIG. 2, with each butterfly operation again utilizing the equations, A, B, C and D and then placing the resultant transformed data into the four submatrices in the right column as indicated. Notice that, in the right column, the top four X positions are even-even, followed by even-odd, followed by odd-even, followed by odd-odd. Each of the four submatrices is then a starting point for the next pass of the transformation as explained with reference to the example below for an 8×8 matrix.

Each of the eight butterfly operations illustrated in FIG. 2 implements the four equations for A, B, C, and D indicated above, and thus the butterfly operations can be carried out by the AL circuit of FIG. 1, as explained above.

The following exemplary data window flow operations are given for an 8×8 matrix in which data from the four corners of each window is transformed in the manner illustrated and explained with reference to FIGS. 1 and 2.

THE FIRST PASS: (window size is 4×4)

We start the window operations by putting the upper left corner position of the window at the position (0,0) as shown below. The data from each of these four points in the matrix is combined in butterfly operations pursuant to the four equations A, B, C and D.

```
*   .   .   .   *   .   .   .
.   .   .   .   .   .   .   .
.   .   .   .   .   .   .   .
*   .   .   .   *   .   .   .
.   .   .   .   .   .   .   .
.   .   .   .   .   .   .   .
.   .   .   .   .   .   .   .
.   .   .   .   .   .   .   .
       The First Window in the First Pass
```

Then we move the window one position rightward at each step until we get to the position as shown below.

```
.   .   *   .   .   .   *   .
.   .   .   .   .   .   .   .
.   .   .   .   .   .   .   .
.   .   *   .   .   .   *   .
.   .   .   .   .   .   .   .
.   .   .   .   .   .   .   .
.   .   .   .   .   .   .   .
.   .   .   .   .   .   .   .
       The Fourth Window in the First Pass
```

Now we put the upper left corner of the window at the position as shown below.

```
.   .   .   .   .   .   .   .
*   .   .   .   *   .   .   .
.   .   .   .   .   .   .   .
.   .   .   .   .   .   .   .
*   .   .   .   *   .   .   .
.   .   .   .   .   .   .   .
.   .   .   .   .   .   .   .
.   .   .   .   .   .   .   .
       The Fifth Window in the First Pass
```

Then we move the window one position rightward at each step until we reach the position as shown below.

```
.   .   .   .   .   .   .   .
.   .   .   *   .   .   .   *
.   .   .   .   .   .   .   .
.   .   .   .   .   .   .   .
```

-continued

```
.   .   .   *   .   .   .   *
.   .   .   .   .   .   .   .
.   .   .   .   .   .   .   .
.   .   .   .   .   .   .   .
       The Eighth Window in the First Pass
```

The previous procedures are repeated over every row in the upper half matrix. The last window is shown below (window sixteen).

```
.   .   .   .   .   .   .   .
.   .   .   .   .   .   .   .
.   .   .   .   .   .   .   .
.   .   .   *   .   .   .   *
.   .   .   .   .   .   .   .
.   .   .   .   .   .   .   .
.   .   .   .   .   .   .   .
.   .   .   *   .   .   .   *
       The Last Window in the First Pass.
```

The first pass is now completed. Pursuant to the disclosed algorithm, a radix −2 by radix −2 butterfly operation is performed on the data from each of the four corners of each window. The transformed data is then recursively subdivided in subsequent passes until the transformation is completed to a 1×1 (two data points by two data points) matrix, which is the last pass, and the transformation is then finished. The size of the data window becomes progressively smaller in each pass, and in the ith pass, the size of the window is $(N/2^i) \times (N/2^i)$. Thus in the present example of an 8×8 matrix, the size of the window in the first pass was $(8/2^1) \times (8/2^1)$, or 4×4. In the second pass, the size of the window is $(8/2^2) \times (8/2^2)$, or 2×2.

THE SECOND PASS: (window size is 2×2)

The window is applied to each submatrix. A typical example is shown below. The second pass needs 16 windows. The data points for the first window are indicated with asterisks and the numbers 1, while the data points for each of the other 16 windows are indicated by numbers as shown.

| 1 | 2 | 1 | 2 | 5 | 6 | 5 | 6 |
|---|---|---|---|---|---|---|---|
| 3 | 4 | 3 | 4 | 7 | 8 | 7 | 8 |
| 1 | 2 | 1 | 2 | 5 | 6 | 5 | 6 |
| 3 | 4 | 3 | 4 | 7 | 8 | 7 | 8 |
| 9 | 10 | 9 | 10 | 13 | 14 | 13 | 14 |
| 11 | 12 | 11 | 12 | 15 | 16 | 15 | 16 |
| 9 | 10 | 9 | 10 | 13 | 14 | 13 | 14 |
| 11 | 12 | 11 | 12 | 15 | 16 | 15 | 16 |

The Typical Window in the Second Pass.

The size of the window in the third pass is $(8/2^3) \times (8/2^3)$ of 1×1, after which the transformation is completed.

THE THIRD PASS: (window size is 1×1)

The window is applied to sixteen 2×2 submatrices. A typical window is shown below. The third pass needs 16 windows.

```
  *    *    .    .    .    .    .    .
  *    *    .    .    .    .    .    .
  .    .    .    .    .    .    .    .
  .    .    .    .    .    .    .    .
  .    .    .    .    .    .    .    .
  .    .    .    .    .    .    .    .
  .    .    .    .    .    .    .    .
  .    .    .    .    .    .    .    .
```
The Typical Window in the Third Pass.

The window transformations explained above with respect to the first, second and third passes have been explained as occurring in series. However, they can be carried out in parallel also, or in any particular order, with the only real limitation being that all of the input data required for the butterfly operations in any one pass must generally be completed prior to initiation of those butterfly operations. Note that in the above example, each of the first, second and third passes required the same number of windows, i.e., sixteen. This follows logically from the fact that each window combines four inputs, albeit from different locations in the overall matrix.

The foregoing example started with an 8×8 matrix. However, the same general principles are applicable to larger matrices such as a 16×16 matrix, a 64×64 matrix, or a 1028×1028 matrix, or to smaller matrices.

Figure 3:
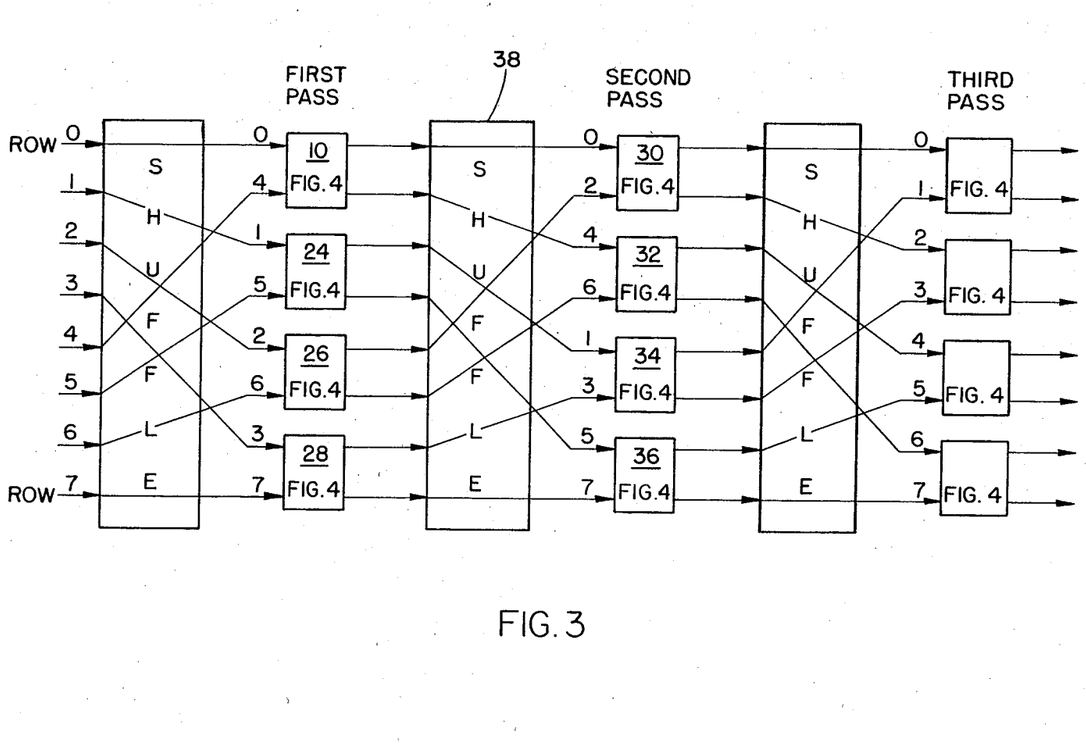
FIG. 3 illustrates one exemplary embodiment of the pipeline and parallel architecture and circuitry of the present invention for implementing the new algorithm disclosed herein.

The matrix transformation can be advantageously implemented by the architecture of the logic circuit of FIG. 3 which is applied to an illustrative 8×8 matrix in which the data for each column therein is fed column by column into the inputs labeled row 0 to 7 on the left side of FIG. 3.

In this circuit the data transformation in the x dimension is accomplished by sets of switching circuits, as illustrated and explained below with regard to FIGS. 4 and 5, and the data transformation in the y dimension is accomplished by a shuffle operation as illustrated and explained with reference to FIG. 6.

Figure 6:
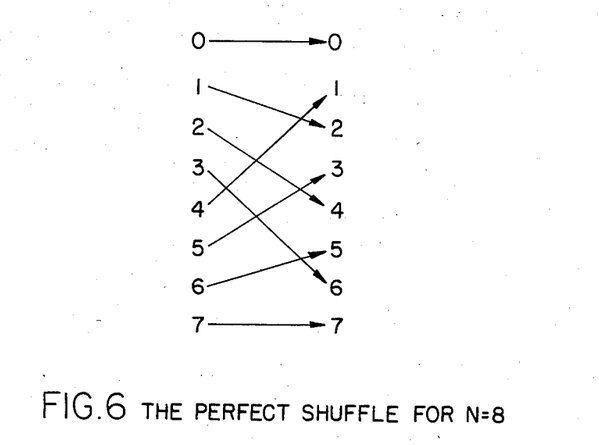
FIG. 6 is a simple illustration of a perfect shuffle data flow operation for N equals 8.

Referring to FIG. 6 for a brief explanation of the perfect shuffle operation, it involves a reordering of the rows (or columns) of data in which the 0 and 7 rows remain as the 0 and 7 rows, but the 1, 2, 3, 4, 5 and 6 rows are shuffled or rearranged as shown to become respectively the 2, 4, 6, 1, 3 and 5 rows. This perfect shuffle operation can be accomplished simply by a change of the sequence of the data lines in the manner shown.

In the architecture of the circuit of FIG. 3, three perfect shuffle operations are performed sequentially on the data, which results in the order of the rows at the output being the same as the order of the rows at the input.

Figure 4:
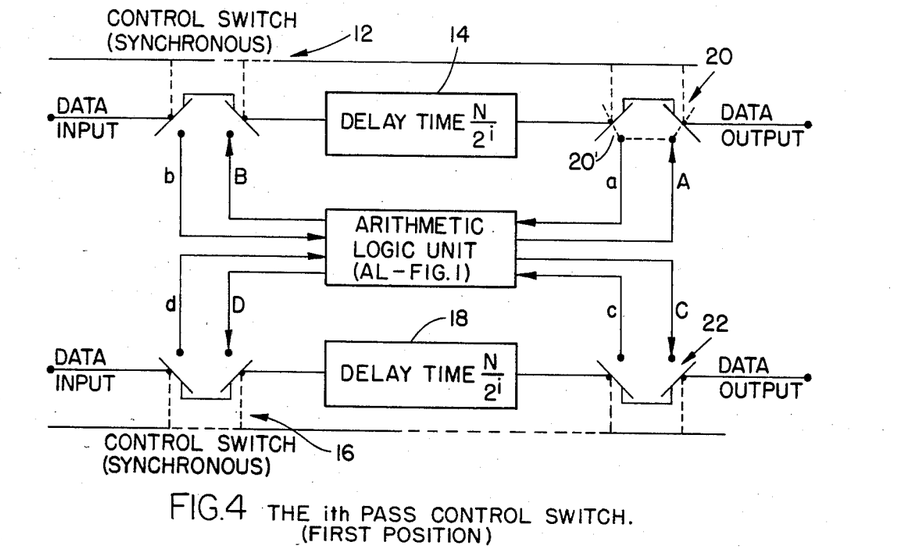
FIGS. 4 and 5 illustrate respectively first and second switching positions of an exemplary embodiment of one parallel switching arrangement which provides for extremely efficient data flow in the data transformation.
Figure 5:
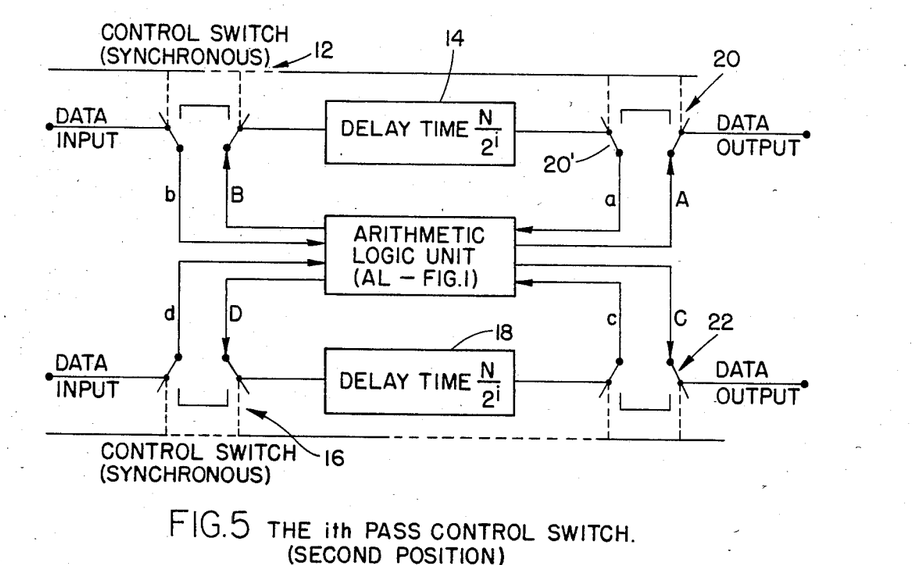

The data transformation in the x direction is accomplished by a set of four switching circuits in each of the first, second and third passes, with each switching circuit being designed in the preferred embodiment to have the configuration of the circuit of FIGS. 4 and 5, and each such switching circuit incorporating therein the Arithmetic Logic circuit of FIG. 1.

The architecture of the circuit of FIG. 3 is designed to take advantage of the flow of data from an auxiliary memory, such as a storage disc, whereon the data for a row or column is typically stored and read out on a row by row or column by column basis. Referring to FIG. 3, eight rows of data (0 to 7), are directed to a perfect shuffle arrangement as illustrated in FIG. 6.

For the first pass of the transform operation illustrated in FIG. 3, butterfly operations of the type illustrated in FIG. 2 are performed simultaneously on four pairs of rows, the upper butterfly operations on rows 0 and 4, the second on rows 1 and 5, the third on rows 2 and 6, and the fourth on rows 3 and 7.

It should be noted initially that the data flow and switching operations of the circuits of FIGS. 3, 4 and 5 (which includes Arithmetic Logic circuits of the type of FIG. 1) are illustrated in the preferred embodiment as being synchronous types of circuits, the timing of the operations of which are controlled by one central clock.

FIGS. 4 and 5 illustrate the switching arrangement in the X direction. Taking the upper butterfly operations in control switch 12 on rows 0 and 4 as an example, the data input on the upper data line is sequentially fed the data values X0,0, X0,1, X0,2, X0,3, X0,4, X0,5, X0,6, and X0,7. The synchronous commutating switch 12 is initially positioned as shown in FIG. 4 to allow the data to flow sequentially into a pipeline delay line 14 (similar in concept to a clocked shift register) having a delay of $N=8/2^1=4$ data words, thus allowing the first four data words X0,0, X0,1, X0,2, and X0,3 to fill the delay line.

In a similar manner, the data input on the lower data line is sequentially fed the values X(4,0), X(4,1), X(4,2), X(4,3), X(4,4), X(4,5), X(4,6), and X(4,7). The synchronous commutating switch 16 is initially positioned as illustrated in FIG. 4 to allow the data to flow sequentially into a pipeline delay line 18, also having a total delay of 4 data words, thus allowing the delay line 18 to be filled with the first four data words X(4,0), X(4,1), X(4,2), and X(4,3).

The commutating input switches 12 and 16, along with commutating output switches 20 and 22, are then switched to their second positions, illustrated in FIG. 5, thus allowing X(0,0) from the delay line 14 to flow as an input on data line a into the Arithmetic Logic unit. The input commutating switch 12 simultaneously directs X(0,4) as an input on data line b into the arithmetic unit. Thus inputs X(0,0) and X(0,4) are clocked into the AL circuit on input lines a and b.

In a similar manner, the data input on the lower data line is initially fed the data values X(4,0), X(4,1), X(4,2), and X(4,3) which proceed into delay line 18, prior to switching of the commutating switches 16 and 22 to their second positions, thus allowing X(4,0) to be directed as an input to the AL on data line c and X(4,4) as an input to the AL on data line d. These four data values are those required for the butterfly operation of the first window of the first pass (for the 8×8 matrix example above). As explained above with reference to FIGS. 1 and 2, the AL unit first performs the additions and subtractions necessary in the first logical operation thereon. The AL unit then multiplies these intermediate values by the complex vector values as indicated in the equations for A, B, C and D to provide the four transforms A, B, C and D on data output lines A, B, C and D to complete the first pass of the transformation for the first window. In the second switched positions of switches 12, 16, 20 and 22, shown in FIG. 5, the data outputs of the AL unit on lines A and C are immediately available on the data output lines to form the first four data words thereon, while the data outputs of the AL unit on lines B and D are clocked into the delay lines 14 and 18, in which they are delayed by four data words, after which the synchronous switches 12, 16, 20 and 22 are switched again to their first positions, FIG. 4, such that they pass from delay lines 14 and 18 directly to the data outputs to form the fifth through eighth words on the data output. When the synchronous switches 12, 16, 20 and 22 are switched back to their first positions, FIG. 4, the next four input data words for the second window are clocked into the delay lines immediately behind the fifth through eighth data output words. In this overall arrangement, the data is clocked into the First Pass over 8 data words and, after a delay of 4 data words, is clocked out over 8 data words.

Simultaneously therewith, the control switching arrangement 24 performs similar operations on lines 1 and 5 for the fifth window of the first pass, the control switching arrangement 26 performs similar operations on lines 2 and 6 for the ninth window of the first pass, and the control switching arrangement 28 performs similar operations on lines 3 and 7 for the thirteenth window of the first pass. This completes the first, fifth, ninth and thirteenth windows of the first pass.

The transformed data is then clocked to the next four switching arrangements 30, 32, 34 and 36 of the Second Pass, after passing through a second shuffle operation 38. The Second Pass switching arrangements then operate in a manner similar to the First Pass switching arrangements 10, 24, 26 and 28, with the delay period of each delay line therein now being $8/2^2$, or 2 words, prior to the switching of the synchronous control switches in each switching arrangement 30, 32, 34 and 36 to perform the Second Pass transformations. Likewise, the Third Pass switching arrangements operate in a manner similar to the First and Second Pass switching arrangements to perform the Third Pass transformations, with the delay period of each delay line in the Third Pass now being $8/2^3$, or 1 word, prior to the switching of the synchronous control switches in each switching arrangement.

Returning to the switching arrangement 10 of the First Pass switching operation, after the first window transformation operation is completed on the data set X(0,0), X(0,4), X(4,0), and X(4,4), and as the resultant transformations are being clocked into the Second Pass, the next data set X(0,1), X(0,5), X(4,1) and X(4,5) are then being clocked into the AL unit, and the butterfly transformations are then performed for X(0,1), X(0,5), X(4,1), and X(4,5) to perform the butterfly transformations on the second window in the first pass. Likewise, arithmetic units 24, 26 and 28 perform similar operations on their input data lines to perform the sixth, tenth and fourteenth butterfly operations.

The data is then clocked to the next data columns of the input data to perform the third, seventh, eleventh and fifteenth butterfly operations, and the data is then clocked to the next and last data columns of the matrix to perform the fourth, eighth, twelfth and sixteenth butterfly operations, which completes the first pass of the transformation.

In summary, the First Pass switching arrangements first perform the butterfly transformations in parallel on the first, fifth, ninth and thirteenth windows of the first pass, then perform the butterfly transformations in parallel on the second, sixth, tenth and fourteenth windows of the first pass, next perform the butterfly transformations in parallel on the third, seventh, eleventh and fifteenth windows of the first pass, and finally perform the butterfly transformations on the fourth, eighth, twelfth and sixteenth windows of the first pass, thus completing the first pass of the matrix transformation.

When the first, fifth, ninth and thirteenth butterfly operations are completed by the AL units 10, 24, 26 and 28, the output data is then directed through a second shuffle 38 to fifth, sixth, seventh and eighth control switches 30, 32, 34 and 36 to perform the Second Pass of the transformation as illustrated in FIG. 3. Likewise, when the Second Pass of the transformation is completed, the output data is directed through a third shuffle 40 to the Third Pass control switches.

In this manner, the transformations are carried on in parallel in each of the switching arrangements 10, 24, etc. in each pass, while also being carried out in pipelined or series fashion in the several passes and also for the consecutive columns or rows within each pass.

The synchronous control switches are illustrated in FIGS. 4 and 5 as having a mechanical configuration. However, one preferred embodiment of the present invention would utilize semiconductor switches having very rapid switching times, preferably arranged in a Very Large Scale Integrated (VLSI) circuit for implementing the highly parallel architecture and circuits desclosed herein.

The data path width of the circuits herein can be equal to the number of bits in a data word, for example, 8, 12 or 16 bits, depending upon the application of the two dimensional fast fourier transform. Consequently, the AL units employed therewith should have the capability of performing word parallel arithmetic. Alternatively, in other contemplated embodiments, the data can be transmitted bit serially, with the AL units employed therewith having the capability of performing bit serial arithmetic. With the latter embodiment, a CORDIC algorithm (The CORDIC Trigonometric Computing Technique, IEEE Trans. Elec. Comp., Vol. EC-9, p. 227-231, September, 1960) can be applied in the arithmetic processors.

In summary, the architecture of the present invention can be implemented with parallel arithmetic or with bit serial arithmetic. The control switches, shuffle networks and arithmetic processors can be implemented with fully parallel pipelined architecture or with iteratively parallel architecture. It is estimated that implementation of the proposed fully parallel pipelined architecture utilizing state of the art technology, for instance a multiplier having a 150 nanosecond response time (TRW, LSI Multipliers: N×N Bit Parallel Multipliers, TRW, One Space Park, CA., 1977), could perform a 1024×1024 FFT in 1 millisecond (ms).

While several embodiments and variations of the architecture of the present invention for a two dimensional fast fourier transform are described in detail herein, it should be apparent that the disclosure and teachings of the present invention will suggest many alternative designs to those skilled in the art.

What is claimed is:

1. A pipelined and parallel system for implementing a two dimensional fast fourier transform on an array of input data values, with the transformation being performed by a plurality of serially arranged pass stages, with each pass stage comprising, a. shuffle means for receiving an ordered set of input data for that pass stage and for performing a shuffle operation thereon to produce a shuffled order of input data, with the first pass stage receiving an ordered set of input data from a row or column of a two dimensional matrix of such input data values, and pass stages subsequent to the first pass stage receiving an ordered set of input data from the preceding pass stage; and b. a plurality of identical switching circuit means coupled in parallel to receive the shuffled order of input data, each switching circuit means including an arithmetic logic unit with four inputs for receiving four input data values and including means for performing four data transformations of the four input data values to produce four output data values, said means for performing each of the four data transformations including a first means for performing a first operation of selective addition or subtraction of the four input data values, followed by a second means for performing a second operation of selective multiplication by an exponential multiplier.

2. A pipelined and parallel system for implementing a two dimensional fast fourier transform as claimed in claim 1, each arithmetic logic unit receiving four input data values a, b, c and d, and said first and second means combining the input data values by executing the following four data operations thereon to produce four output data values A, B, C and D, $$A=[a+b+c+d]\omega_N^0,$$

$$B=[a-b+c-d]\omega_N^\nu,$$

$$C=[a+b-c-d]\omega_N^\mu,$$

$$D=[a-b-c+d]\omega_N^{\mu+\nu},$$

and
wherein said first means performs the operations of $[a+b+c+d]$, $[a-b+c-d]$, $[a+b-c-d]$, and $[a-b-c+d]$, and wherein said second means utilizes the exponential multipliers $\omega_N^0$, $\omega_N^\nu$, $\omega_N^\mu$ and $\omega_N^{\mu+\nu}$.

3. A pipelined and parallel system for implementing a two dimensional fast fourier transform as claimed in claim 2, wherein, for a two dimensional array of N by N data values, the first pass stage performs window data operations on sets of data values arranged in window sizes N/2 by N/2, and the second pass stage performs window data operations on sets of data values arranged in window sizes $N/2^2$ by $N/2^2$, and the $i^{th}$ pass stage performs window data operations on sets of data values arranged in window sizes $N/2^i$ by $N/2^i$, and the last pass stage performing window data operations on sets of data values arranged in a 1 by 1 data window size, wherein the window data sizes in each pass stage are decreased in half in that pass stage, with the shuffle means in each pass stage decreasing the window data size in half in a first direction, and the switching circuit means in each pass stage decreasing the window data size in half in a second direction.

4. A pipelined and parallel system for implementing a two dimensional fast fourier transform as claimed in claim 3, wherein each switching circuit means includes two input data lines, a set of two synchronous delay lines, and a set of two input synchronous switches for switching input data on the two input data lines into either the arithmetic logic unit of that switching circuit means or into the set of two synchronous delay lines in that switching circuit means, two output data lines, and a set of two output synchronous switches, coupled to the arithmetic logic unit of that switching circuit means and further coupled to the set of two synchronous delay lines, for switching input data from the delay lines and from the arithmetic logic unit either to the two data output lines or as data inputs to the arithmetic logic unit.

5. A pipelined and parallel system for implementing a two dimensional fast fourier transform as claimed in claim 4, wherein for each switching circuit means in each $i^{th}$ pass, the two synchronous delay lines therein have delays of $N/2^i$, and further including means for simultaneously and synchronously switching the two input synchronous switches and two output synchronous switches after each delay of $N/2^i$.

6. A pipelined and parallel system for implementing a two dimensional fast fourier transform as claimed in claim 1, wherein, for a two dimensional array of N by N data values, the first pass stage performs window data operations on sets of data values arranged in window sizes N/2 by N/2, and the second pass stage performs window data operations on sets of data values arranged in window sizes $N/2^2$ by $N/2^2$, and the $i^{th}$ pass stage performs window data operations on sets of data values arranged in window sizes $N/2^i$ by $N/2^i$, and the last pass stage performing window data operations on sets of data values arranged in a 1 by 1 data window size, wherein the window data sizes in each pass stage are decreased in half in that pass stage, with the shuffle means in each pass stage decreasing the window data size in half in a first direction, and the switching circuit means in each pass stage decreasing the window data size in half in a second direction.

7. A pipelined and parallel system for implementing a two dimensional fast fourier transform as claimed in claim 1, wherein each switching circuit means includes two input data lines, a set of two synchronous delay lines, and a set of two input synchronous switches for switching input data on the two input data lines into either the arithmetic logic unit of that switching circuit means or into the set of two synchronous delay lines in that switching circuit means, two output data lines, and a set of two output synchronous switches, coupled to the arithmetic logic unit of that switching circuit means and further coupled to the set of two synchronous delay lines, for switching input data from the delay lines and from the arithmetic logic unit either to the two data output lines or as data inputs to the arithmetic logic unit.

8. A pipelined and parallel system for implementing a two dimensional fast fourier transform as claimed in claim 7, wherein for each switching circuit means in each $i^{th}$ pass, the two synchronous delay lines therein have delays of $N/2^i$, and further including means for simultaneously and synchronously switching the two input synchronous switches and two output synchronous switches after each delay of $N/2^i$.

9. A pipelined and parallel system for implementing a two dimensional fast fourier transform as claimed in claim 1, wherein said plurality of identical switching circuit means are synchronous switching circuits controlled by a common clock.

10. A circuit for implementing a two dimensional fast fourier transform on an array of N by N input data values, comprising:

a. a plurality of serially arranged pass stage circuits for performing the transformation, with each successive pass stage circuit performing window data operations on successively smaller data windows, in which the first pass stage circuit includes means for performing window data operations on sets of data values arranged in window sizes N/2 by N/2, and the second pass stage circuit includes means for performing window data operations on sets of data values arranged in window sizes $N/2^2$ by $N/2^2$, and the $i^{th}$ pass stage circuit includes means for performing window data operations on sets of data values arranged in window sizes $N/2^i$ by $N/2^i$, and the last pass stage circuit includes means for performing window data operations on data values arranged in a 1 by 1 data window; and b. said means for performing in each pass stage circuit including a plurality of parallel arranged arithmetic logic units for performing data operations in parallel, each arithmetic logic unit having four input data lines for receiving four input data values for that pass stage circuit, with the first pass stage receiving an ordered set of input data from a row or column of a two dimensional matrix of such input data values, and pass stages subsequent to the first pass stage receiving an ordered set of input data from the preceding pass stage, and means for performing four data transformations on the four input data values to produce four output data values, said means for performing each of the four data transformations including a first means for performing a first operation of selective addition or subtraction of the four input data values, followed by a second means for performing a second operation of selective multiplication by an exponential multiplier.

11. A circuit for implementing a two dimensional fast fourier transform as claimed in claim 10, each arithmetic logic unit receiving four input data values a, b, c and d, and combining the input data values by executing the following four data operations thereon to produce four output data values A, B, C and D, $$A = [a+b+c+d]\omega_N^\rho,$$

$$B = [a-b+c-d]\omega_N^\nu,$$

$$C = [a+b-c-d]\omega_N^\mu,$$

$$D = [a-b-c+d]\omega_N^{\mu+\nu},$$

and wherein said first means performs the operations of $[a+b+c+d]$, $[a-b+c-d]$, $[a+b-c-d]$, and $[a-b-c+d]$, and wherein said second means utilizes the exponential multipliers $\omega_N^\rho$, $\omega_N^\nu$, $\omega_N^\mu$ and $\omega_N^{\mu+\nu}$.

12. A pipelined and parallel system for implementing a two dimensional fast fourier transform as claimed in claim 11, wherein each switching circuit means includes two input data lines, a set of two synchronous delay lines, and a set of two input synchronous switches for switching input data on the two input data lines into either the arithmetic logic unit of that switching circuit means or into the set of two synchronous delay lines in that switching circuit means, two output data lines, and set of two output synchronous switches, coupled to the arithmetic logic unit of that switching circuit means and further coupled to the set of two synchronous delay lines, for switching input data from the delay lines and from the arithmetic logic unit either to the two data output lines or as data inputs to the arithmetic logic unit.

13. A pipelined and parallel architecture for implementing a two dimensional fast fourier transform as claimed in claim 12, wherein for each switching circuit means in each $i^{th}$ pass, the two synchronous delay lines therein have delays of $N/2^i$, and further including means for simultaneously and synchronously switching the two input synchronous switches and two output synchronous switches after each delay of $N/2^i$.

14. A pipelined and parallel system for implementing a two dimensional fast fourier transform as claimed in claim 10, wherein each switching circuit means includes two input data lines, a set of two synchronous delay lines, and a set of two input synchronous switches for switching input data on the two input data lines into either the arithmetic logic unit of that switching circuit means or into the set of two synchronous delay lines in that switching circuit means, two output data lines, and a set of two output synchronous switches, coupled to the arithmetic logic unit of that switching circuit means and further coupled to the set of two synchronous delay lines, for switching input data from the delay lines and from the arithmetic logic unit either to the two data output lines or as data inputs to the arithmetic logic unit.

* * * * *